J. McADAMS.
SOLIDIFIED MOLASSES AND PROCESS OF MAKING SAME.
APPLICATION FILED NOV. 29, 1913.

1,146,337.

Patented July 13, 1915.

UNITED STATES PATENT OFFICE.

JAMES McADAMS, OF SAUSALITO, CALIFORNIA.

SOLIDIFIED MOLASSES AND PROCESS OF MAKING SAME.

1,146,337. Specification of Letters Patent. Patented July 13, 1915.

Application filed November 29, 1913. Serial No. 804,720.

*To all whom it may concern:*

Be it known that I, JAMES McADAMS, a citizen of the United States, residing in Sausalito, in the county of Marin and State of California, have invented new and useful Improvements in Solidified Molasses and Processes of Making Same, of which the following is a specification.

This invention relates to the process of solidifying molasses by means of slaked or unslaked lime, and has for its object the rendering of molasses sufficiently solid to be granulated or pulverized so that the product may be readily mixed with the soil for the purpose of fertilization.

Figure 1:
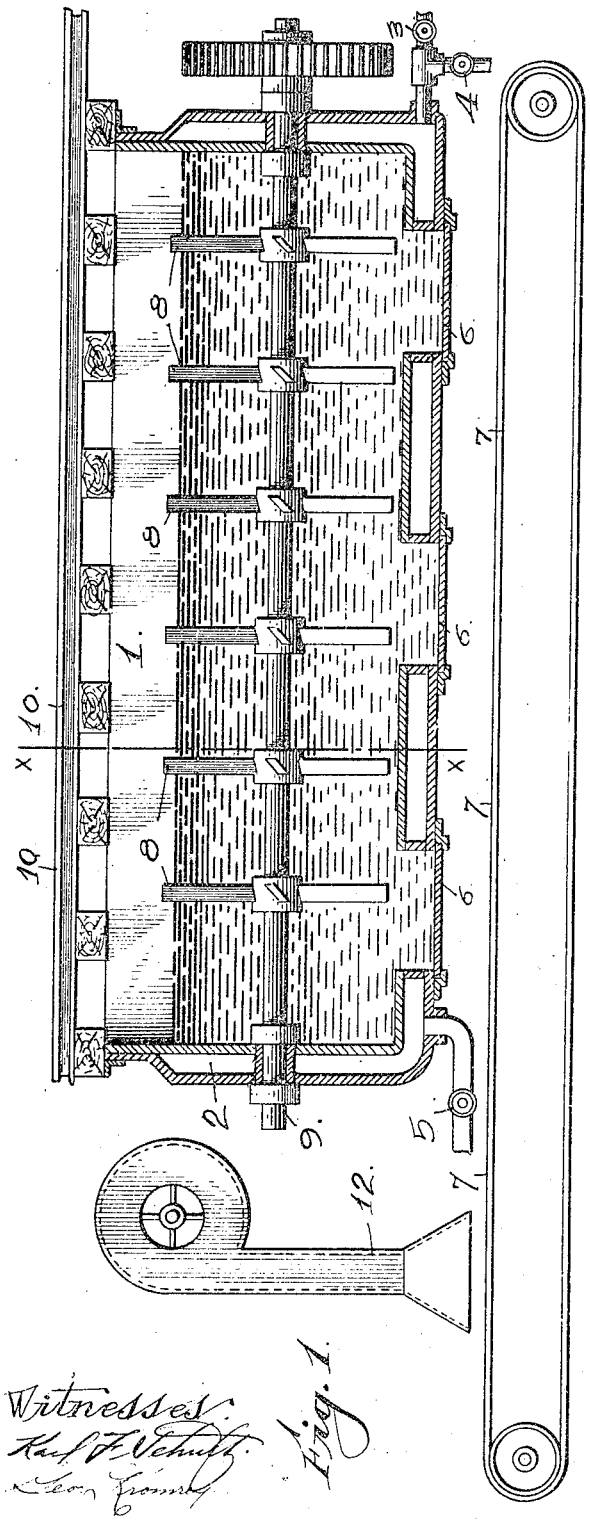
Figure 2:
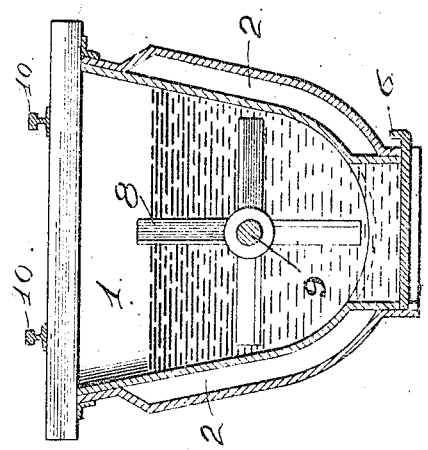

I have shown in Figure 1 of the drawing forming a part of the present specification, an arrangement whereby the molasses may be properly mixed with the lime and spread upon a conveyer where it is subject to a draft of air from a blower. Fig. 2 is a vertical, transverse sectional view of Fig. 1 taken on line X—X of the said figure.

In the manufacture of sugar from cane, the residue or molasses from the mills is produced in quantities which far exceed the demand. Consequently the greater part of the molasses becomes a nuisance, for the reason that it can not be disposed of by marketing, burning or returning to the soil. It therefore becomes an expense to the manufacturers and a detriment to the community in the vicinity of the factory.

In the manufacture of sugar, lime is used extensively and the slaked lime is also produced in such quantities as to render it an expense to dispose of the same.

I propose to solidify the molasses by mixing the same with the slaked lime and then granulate or pulverize the hardened product which, by reason of the presence of potash, can be used to advantage as a fertilizer and returned to the soil.

The molasses is taken from the mills in suitable cars and placed in a mixer 1 which is provided with a jacket 2 to which steam may be admitted by means of the valve 3, or water by means of the valve 4. A suitable drain 5 is provided for removing the water from the jacket 2 when the mixture within the mixer becomes too cold and admitting steam by means of the valve 3. The mixer 1 is also provided with suitable gates 6 in the bottom thereof so that the contents may be flowed by gravity onto a conveyer 7, beneath the said mixer 1. Blades 8 are provided at regular intervals upon a revolving shaft 9 within the mixer 1. Rails 10 are secured upon the mixer 1 so that the cars containing the molasses may pass directly over the said mixer. A blower 12 is provided to direct a blast of cold air to the molasses on the conveyer.

The process is as follows: Equal proportions of molasses and lime are placed within the mixer 1 and steam is admitted to the jacket 2 by means of the valve 3 until the mass within the mixer is raised to a temperature of from 120 to 130 degrees Fahrenheit and stirred by the blades 8 on the revolving shaft 9 for a period of 30 minutes, after which the mass is transferred in a layer to the conveyer 7 by means of the gates 6. The conveyer 7 conveys the mass below a blower 12 where it is subjected to a blast of cold, dry air which solidifies the mass. The hardened mixture of molasses and lime may then be easily granulated or ground to a grade that can be readily mixed with the soil.

Slaked or unslaked lime may be used to solidify the molasses, consequently the disposition of the slaked lime which has been heretofore an expense may be turned into a product. If slaked lime is not produced by the mills in equal quantities with the molasses, the excess molasses may be solidified by means of unslaked lime and in this manner most of the molasses produced may be converted into fertilizer.

Having thus described my invention what I claim as new and desire to secure by Letters Patent is—

1. The process of solidifying molasses by mixing with equal parts of lime and subjecting the mixture to a temperature of from 120 to 130 degrees Fahrenheit, for a period of thirty minutes, spreading in a layer and subjecting to a blast of cold, dry air.

2. The process of solidifying molasses by mixing with equal parts of slaked lime, subjecting the mixture to a temperature of from 120 to 130 degrees Fahrenheit for a period of thirty minutes, spreading in a layer and subjecting to a blast of cold, dry air.

3. The process of solidifying molasses by mixing with equal parts of slaked lime, subjecting the mixture to a temperature of from 120 to 130 degrees Fahrenheit for a period of 30 minutes, spreading in a layer and subjecting to a blast of cold, dry air and granulating the hardened product.

4. A composition for use as a fertilizer, the reaction product resulting from treating molasses directly with an equal portion of lime.

5. A composition for use as a fertilizer, the reaction product resulting from treating molasses with an equal quantity of slaked lime.

6. The process of utilizing molasses which consists in mixing directly with equal parts of molasses and lime, heating said mixture, and then cooling and drying said mixture.

In witness whereof I have hereunto set my signature in the presence of two subscribing witnesses.

JAMES McADAMS.

Witnesses:
KARL F. SCHULTZ,
CHAS. F. DUISENBERG.